United States Patent
Kamiya et al.

(10) Patent No.: US 7,403,099 B2
(45) Date of Patent: Jul. 22, 2008

(54) SMART KEY SYSTEM

(75) Inventors: Hodaka Kamiya, Obu (JP); Masachika Kamiya, Toyota (JP); Tomoo Kakegawa, Nishikamo-gun (JP); Akihiro Muramatsu, Toyota (JP)

(73) Assignees: DENSO CORPORATION, Kariya (JP); Toyota Jidosha Kabushiki Kaisha, Aichi-pref. (JP)

( * ) Notice: Subject to any disclaimer, the term of this patent is extended or adjusted under 35 U.S.C. 154(b) by 233 days.

(21) Appl. No.: 11/218,527

(22) Filed: Sep. 6, 2005

(65) Prior Publication Data

US 2006/0082436 A1  Apr. 20, 2006

(30) Foreign Application Priority Data

Sep. 7, 2004  (JP) ............................... 2004-260019

(51) Int. Cl.
*B60R 25/10*  (2006.01)

(52) U.S. Cl. ................ 340/426.29; 307/10.2; 340/5.72; 340/426.16; 340/426.17; 340/426.28

(58) Field of Classification Search ................ 340/5.72, 340/5.64, 5.62, 825.36, 426.13, 426.16, 426.17, 340/426.28, 426.29; 180/287; 307/10.2, 307/10.4, 10.5
See application file for complete search history.

(56) References Cited

U.S. PATENT DOCUMENTS

| | | | | |
|---|---|---|---|---|
| 4,672,375 A * | 6/1987 | Mochida et al. | ............ | 340/5.72 |
| 5,973,611 A * | 10/1999 | Kulha et al. | ................ | 340/5.62 |
| 6,172,430 B1 | 1/2001 | Schmitz et al. | | |
| 6,392,534 B1 * | 5/2002 | Flick | ..................... | 340/426.17 |
| 6,624,741 B1 | 9/2003 | Dais et al. | | |
| 2002/0022494 A1 * | 2/2002 | Brand et al. | ................ | 455/517 |

FOREIGN PATENT DOCUMENTS

| | | |
|---|---|---|
| DE | 42 40 426 A1 | 6/1994 |
| DE | 199 60 260 A1 | 7/2001 |
| DE | 100 56 864 A1 | 6/2002 |

OTHER PUBLICATIONS

Office Communication issued from European Patent Office issued on Dec. 29, 2005 for the corresponding European patent application No. 05019363.0-2421.

* cited by examiner

*Primary Examiner*—Brent Swarthout
(74) *Attorney, Agent, or Firm*—Posz Law Group, PLC (57) ABSTRACT

A smart key system for a vehicle determines that a mobile communicator is not in the passenger compartment and that an in-trunk communicator communicates with the mobile communicator when the trunk gets locked. Then the smart key system executes a recovery process for the mobile communicator locked in the trunk.

12 Claims, 8 Drawing Sheets

FIG. 11

SMART KEY SYSTEM

CROSS REFERENCE TO RELATED APPLICATION

This application is based on and incorporates herein by reference Japanese patent application No. 2004-260019 filed on Sep. 7, 2004.

FIELD OF THE INVENTION

The present invention relates to a smart key system which unlocks doors or a luggage trunk of a vehicle based on wireless communications with a mobile communicator. Especially, the present invention relates to an art of detecting that the mobile communicator is locked in the trunk.

BACKGROUND OF THE INVENTION

A conventional smart key system for a vehicle locks and unlocks doors of the vehicle, based on detecting a user with a mobile communicator through wireless communications with the mobile communicator. The system also detects that the mobile communicator is in a passenger compartment of the vehicle and subsequently allows an engine of the vehicle to start on a button push.

The smart key system also controls an operation of unlocking a luggage trunk of the vehicle. Specifically, when the user operates a switch of the mobile communicator to unlock the trunk, the system authenticates the user and unlocks the trunk on a success of the authentication. In addition, when the mobile communicator is locked in the trunk, the system makes an in-trunk communicator communicate with the mobile communicator interactively and gives a warning to the user if it determines that the mobile communicator is in the trunk. In this case, when the user operates a switch on the outer surface of the vehicle for unlocking the trunk, the system unlocks the trunk even if the mobile communicator is in the trunk.

However, the area in which the mobile communicator can communicate with the in-trunk communicator depends on the location of the in-trunk communicator and the shape of the trunk. Therefore, the area is not always within the trunk and sometimes covers places in the passenger compartment. Thus, the in-trunk communicator possibly communicates with the mobile communicator in the passenger compartment.

In such a case, the user may operate a trunk opener lever in the passenger compartment for unlocking and opening the trunk, take out baggage from the trunk with the mobile communicator left in the passenger compartment, and close the trunk. Then, the system possibly determines that the mobile communicator is locked in the trunk and makes the warning although the mobile communicator is in the passenger compartment and not in the trunk. Moreover, the smart key system possibly unlocks the trunk when someone without the mobile communicator operates the switch on the outer surface. This situation in which anyone can open the trunk will cause a security flaw.

SUMMARY OF THE INVENTION

The present invention addresses the above point. Thus, it is an objective of the present invention to provide a smart key system which detects the situation where a mobile communicator is locked in a luggage trunk of a vehicle more accurately.

A typical user unlocks and opens the trunk as follows. In one case, the user turns on the switch on the outer surface with the mobile communicator in his/her hand. Then the user puts the mobile communicator in the trunk with his/her baggage and closes and locks the trunk. In this way, the mobile communicator is locked in the trunk. In another case, the user operates the lever in the passenger compartment for unlocking and opening the trunk and searches for something in the trunk with the mobile communicator placed in the passenger compartment. This case possibly makes the conventional smart key system determine that the mobile communicator is locked in the trunk although it is in the passenger compartment. If the system is capable of distinguishing the second way from the first way, it detects the situation where the mobile communicator is locked in the trunk with high accuracy.

Based on this, a smart key system of the present invention determines that a mobile communicator is not in the passenger compartment and that an in-trunk communicator communicates with the mobile communicator when the trunk gets locked, and based on the determinations it executes a recovery process for the mobile communicator locked in the trunk.

Thus, the smart key system detects that the mobile communicator is not in the passenger compartment as well as that the mobile communicator is in the trunk before executing the recovery process. By doubly checking if the mobile communicator is locked in the trunk, the smart key system detects the situation where the mobile communicator is locked in the trunk with good accuracy.

The user will be in a serious trouble when the mobile communicator is locked in the trunk and the user is locked out of the passenger compartment. On the other hand, if the mobile communicator is locked in the trunk but the user is not locked out of the passenger compartment, the user can get into the passenger compartment and open the trunk by using the lever in the passenger compartment.

Based on this, the system determines that the user is locked out of the passenger compartment and that the in-trunk communicator communicates with the mobile communicator when the trunk gets locked. Based on the determinations, it executes a recovery process for the mobile communicator locked in the trunk.

Thus, the system detects that the user is locked out of the passenger compartment as well as that the mobile communicator is in the trunk before executing the recovery process. By doing this, the system executes the recovery process selectively when the user cannot get into the passenger compartment to open the trunk by using the lever in the passenger compartment. Therefore the system achieves a better security.

The system may otherwise determine that no one is in the vehicle when the trunk is locked and that the in-trunk communicator communicates with the mobile communicator when the trunk gets locked. Based on the determinations it may execute a recovery process for the mobile communicator locked in the trunk.

Thus, the smart key system detects that the user is not in the passenger compartment as well as that the mobile communicator is in the trunk before executing the recovery process. By doing this, the smart key system executes the recovery process selectively when the user is not in the passenger compartment and thus cannot open the trunk by using the lever in the passenger compartment. Therefore the smart system achieves a better security.

BRIEF DESCRIPTION OF THE DRAWINGS

The invention, together with additional objective, features and advantages thereof, will be best understood from the following description, the appended claims and the accompanying drawings. In the drawings:

DETAILED DESCRIPTION OF THE INVENTION

First Embodiment

Figure 1:
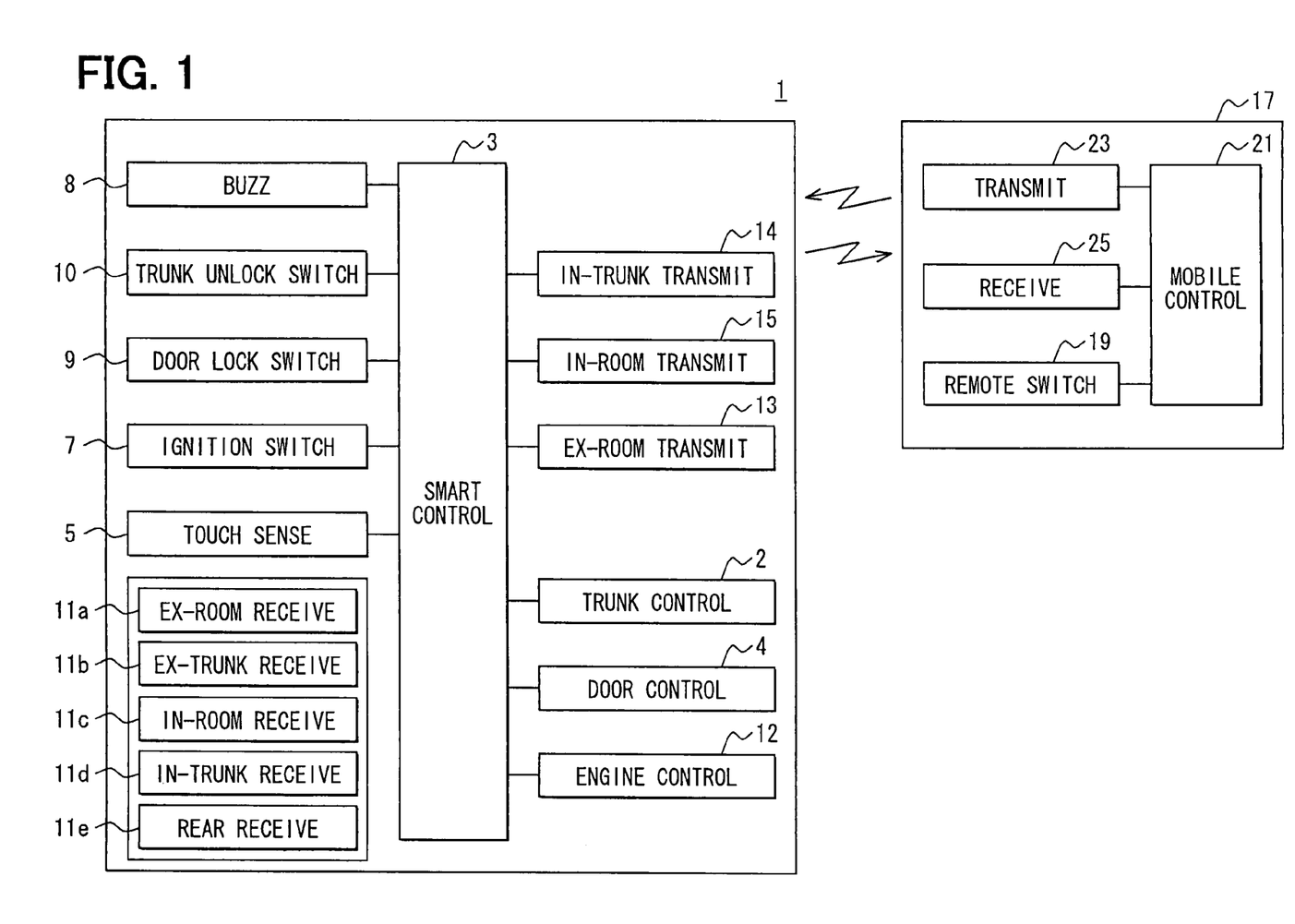
FIG. 1 shows a block diagram of a smart key system in the first embodiment of the present invention.

As shown in FIG. 1 a smart key system 1 for a vehicle includes an electronic controller (hereafter, smart controller) 3 which is installed in the vehicle and a mobile communicator 17.

The mobile communicator 17 includes remote switches 19, an electronic controller (hereafter, mobile controller) 21, a transmitter 23 and a receiver 25.

The remote switches 19 include a remote door lock switch, a remote door unlock switch and a remote trunk unlock switch, which are for locking doors of the vehicle, unlocking doors of the vehicle and unlocking a trunk of the vehicle, respectively. The transmitter 23 has an antenna and a modulator, and the receiver 25 has an antenna and a demodulator. The transmitter 23 and the receiver 25 act as a wireless communication means. The mobile controller 21 has a memory which stores a mobile-side ID of the vehicle and a microcomputer which runs programs. The mobile-side ID is authentication information to distinguish the vehicle from other vehicles. The microcomputer makes wireless communications with the smart controller 3 through the transmitter 23 and the receiver 25. For example, when a user operates the remote switches 19, the microcomputer makes the transmitter 23 transmit a signal to the smart controller 3 depending on the operation.

The smart controller 3 is connected with a trunk controller 2, a smart door controller 4, touch sensors 5, an ignition switch 7, a buzzer 8, a door lock switch 9, a receiver 11, an engine controller 12, ex-room transmitters 13, an in-trunk transmitter 14 and an in-room transmitter 15. Specifically, the trunk controller 2, the door controller 4 and the engine controller 12 are connected bi-directionally with the smart controller 3 through a gateway device (not shown in the Figs.).

The smart controller 3 has a memory storing a vehicle-side ID and has a microcomputer which runs programs. The vehicle-side ID is authentication information to distinguish the vehicle from other vehicles and corresponds to the mobile-side ID. For example, the vehicle-side ID and the mobile-side ID are the same. The microcomputer can make wireless communications with the mobile communicator 17 through the transmitters 13-15 and the receivers 11a-11e. The buzzer 8 produces a warning sound under the control of the smart controller 3.

Each of the touch sensors 5 is installed (specifically, embedded) in each of outside doorknobs of the vehicle and senses that a user touches the corresponding outside doorknob according to a change in capacitance of its capacitor Then each touch sensor 5 outputs a signal indicating the user's touch to the smart controller 3 through a A/D converter (not shown in the Figs.).

The trunk controller 2 receives a signal for locking or unlocking the trunk which the smart controller 3 sent out, and drives a motor for locking or unlocking the trunk according to the signal. When the trunk is unlocked or locked, the trunk controller 2 sends a signal notifying of the unlocking or locking to the smart controller 3. Thus, the trunk controller 2 also detects whether the trunk is being locked or unlocked.

The door controller 4 receives a signal for locking or unlocking the doors which the smart controller 3 sends out, and drives motors for locking or unlocking the doors according to the signal. The door controller 4 also detects whether the doors are being locked or unlocked.

The engine controller 12 receives a signal requesting for starting an engine of the vehicle which the smart controller 3 sends out, and starts the engine according to the signal.

The door lock switch 9 is dedicated to locking the doors and installed, for example, in the outside doorknob by the driver's seat or near the outside doorknob. The door lock switch 9 sends out a signal according to the operation thereof to the smart controller 3. As described later, when the mobile communicator 17 is out of the passenger compartment but close to one of the doors, the door lock switch 9 is enabled so that an ON operation of the switch 9 makes the doors locked.

The trunk unlock switch 10 is dedicated to unlocking the trunk and installed, for example, in a handle on a lid of the trunk or near the handle. The trunk unlock switch 10 sends out a signal according to the operation thereof to the smart controller 3. As described later, when the mobile communicator 17 is near the trunk, the trunk unlock switch 10 is enabled so that an ON operation of the switch 10 makes the trunk unlocked.

The ignition switch 7 is located near a steering wheel of the vehicle and sends out a signal according to the operation thereof to the smart controller 3. As described below, when the user with the mobile communicator 17 turns on the ignition switch 7, the smart controller 3 sends out the signal requesting for starting the engine. Thus, the user can start the engine without using a mechanical ignition key.

Figure 2:
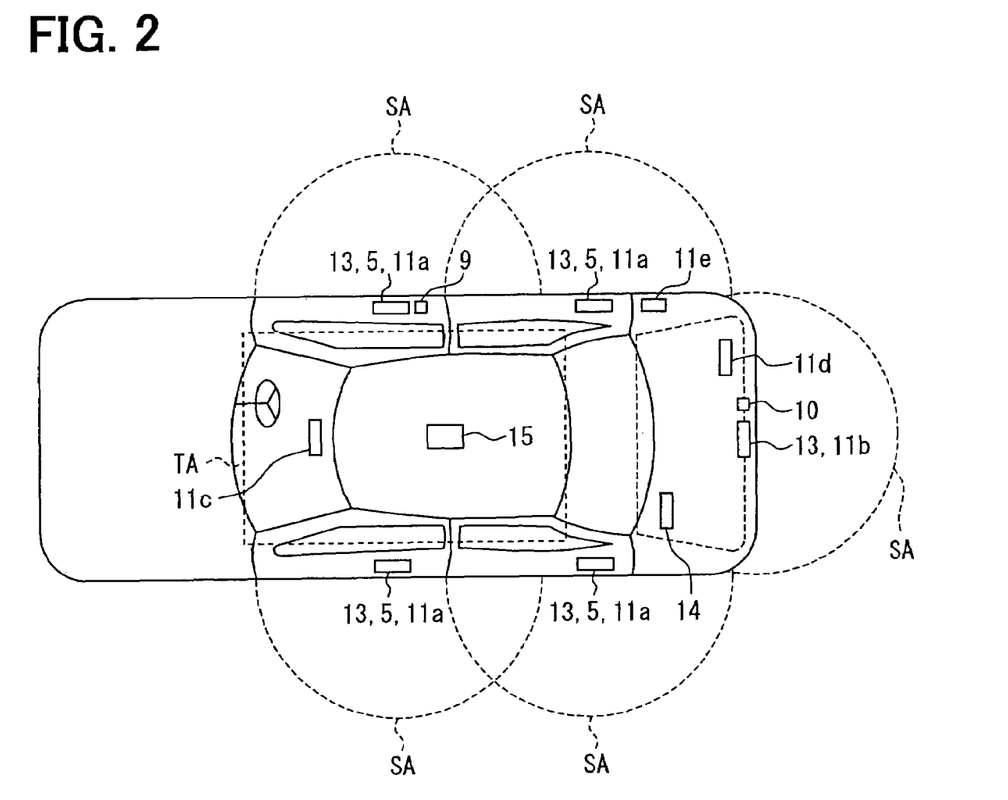
FIG. 2 shows locations of sensors, switches, transmitters and receivers in a vehicle and cover areas of the transmitters and the receivers.

The receiver 11 includes ex-room receivers 11a, an ex-trunk receiver 11b, an in-room receiver 11c, an in-trunk receiver 11d and a rear receiver 11e. Each of the receivers 11a-11e has an antenna and a demodulator, and each of the transmitters 13-15 has an antenna and a modulator. The receivers 11a-11e and the transmitter 13-15 act as a wireless communication means. As shown in FIG. 2, the ex-room receivers 11a are located, for example, at the doors by the driver's seat, a front passenger seat, a rear-left seat and a rear-right seat. The ex-trunk receiver 11b is located, for example, at the top of the lid of the trunk. The in-room receiver 11c is located, for example, in front of the driver's seat and embedded in a rear view mirror of the vehicle. The in-trunk receiver 11d is located, for example, at a position in the trunk. The rear receiver 11e is located near the rear right corner of the vehicle. The receivers 11a-11e receive a signal from the mobile communicator 17 and send out the received signal to the smart controller 3.

As shown in FIG. 2, the ex-room transmitters 13 are located, for example, at the doors by the driver's seat, a front passenger seat, a rear-left seat and a rear-right seat, and further located at the lid of the trunk. For example, each ex-room transmitter 13 may be embedded in a outside doorknob and transmits a first query signal to its surrounding area periodically. Each ex-room transmitter 13 is designed so that the first query signal reaches an area within 70 cm-1 m from the corresponding outside doorknob. Each area is within a dashed curved line in FIG. 2 and is referred to as a first response area SA. Thus, the mobile communicator 17 can receive the first query signal only if it is in the first response areas SA.

The in-room transmitter 15 is, for example, embedded in a passenger compartment lamp in the middle of the passenger compartment. The in-room transmitter 15 transmits a second query signal to the interior of the passenger compartment. The in-room transmitter 15 is designed so that the second query signal reaches a predetermined distance in the passenger compartment. The area is within the passenger compartment and is referred to as a second response area TA. Thus, the mobile communicator 17 can receive the second query signal only if it is in the second response area TA, that is, only if it is in the passenger compartment.

The in-trunk transmitter 14 is located in the trunk, for example, at a corner of the trunk. The in-trunk transmitter 14 transmits a third query signal to the interior of the trunk. The third query signal is also referred to as an in-trunk query signal. The in-trunk transmitter 14 is designed so that the third signal covers an area which roughly overlaps with the trunk. Thus, the mobile communicator 17 can receive the third query signal only if it is in the area. The area may include places in the passenger compartment.

Hereafter, the operation of the smart key system 1 will be described. The smart controller 3 recursively executes the door unlocking process shown in FIG. 3. At the beginning of each execution, the smart controller 3 makes a decision as to whether the doors are locked according to the signal from the door lock switch 9 at step S1. If the decision is YES (locked), the smart controller 3 makes the ex-room transmitters 13 transmit recursively the first query signal at a predetermined interval to search for the mobile communicator 17 at step S2. The smart controller 3 can prohibit the ex-room transmitters 13 from transmitting the first query signal when the engine is active.

Figure 3:
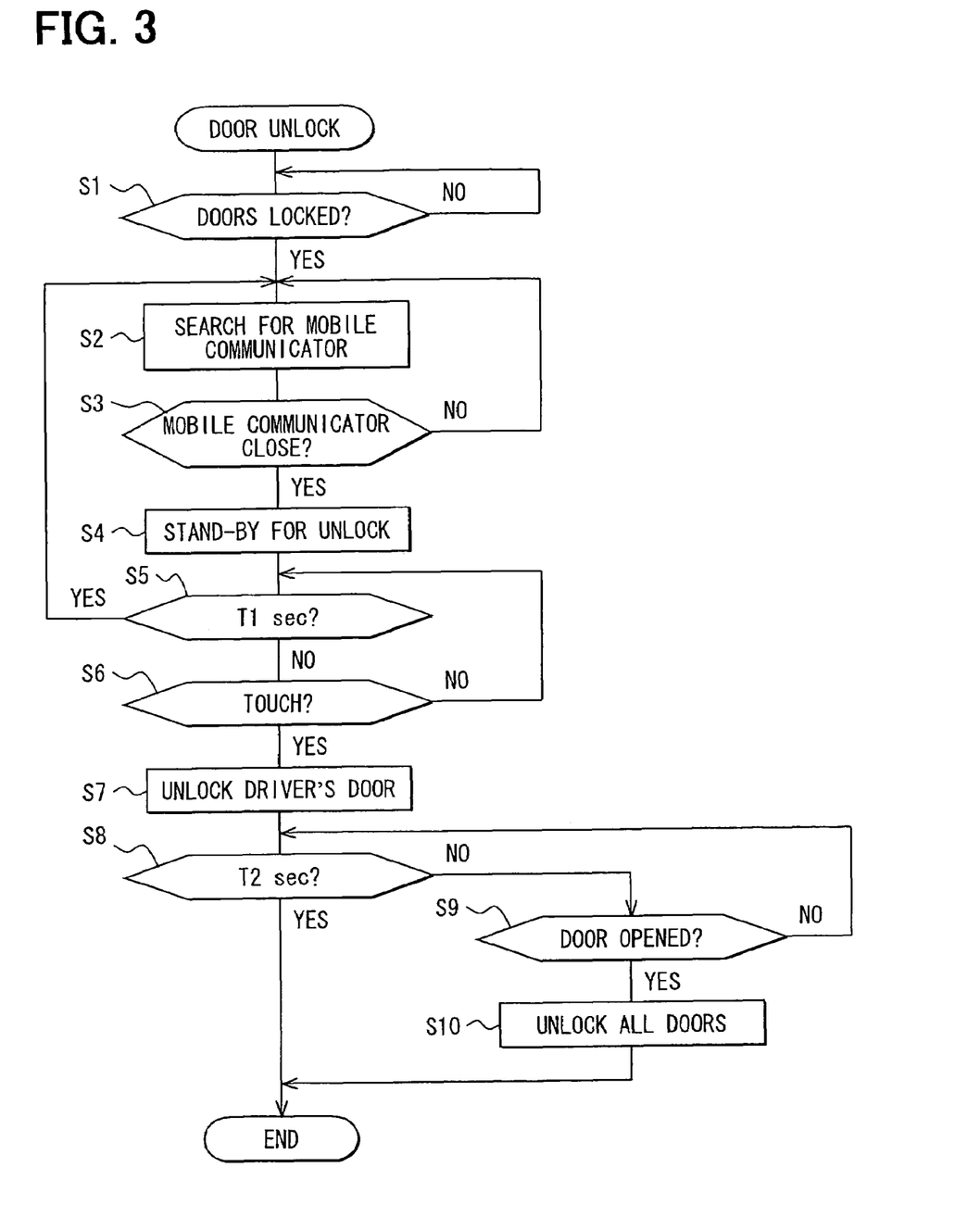
FIG. 3 shows a flowchart of door unlocking process.

Subsequently, the smart controller 3 makes a decision as to whether the mobile communicator 17 transmitted the response signal at step S3. The smart controller 3 makes a decision as to whether the mobile communicator 17 is in a position close to the vehicle, that is, in one of the first response areas SA.

If the mobile communicator 17 is in the area SA, the receiver 25 receives the first query signal and the mobile controller 21 determines whether the signal is normal. If the signal is normal, the mobile controller 21 retrieves the mobile-side ID from its memory and makes the transmitter 23 transmit a response signal including the mobile-side ID to the ex-room receivers 11a or the ex-trunk receiver 11b. When either of the receivers 11a and 11b receives the response signal, the smart controller 3 checks if the decoded mobile-side ID is from the legitimate mobile communicator 17, by checking if the mobile-side ID corresponds to the vehicle-side ID stored in its memory. If the smart controller 3 determines that the mobile-side ID corresponds to the vehicle-side ID, the decision of step S3 becomes YES. Thus the smart controller 3 can verify the legitimate mobile communicator 17 by means of the IDs.

The comparison of the IDs can be made by the mobile communicator 17 in place of the smart controller 3. In this case, the smart controller 3 may put the vehicle-side ID in the first query signal and the mobile controller 21 may check if the vehicle-side ID in the first query signal corresponds to the mobile-side ID in its own memory.

If the vehicle is being parked and the user with the mobile communicator 17 is away from the vehicle (NO at step S3), the smart controller 3 executes steps S2 and S3 in this order periodically. If the decision of step S3 is YES, the smart controller 3 executes step S4 to make the doors stand by for unlocking. While the doors are in the state of the stand-by, the doors are unlocked on a touch of the corresponding outside doorknob. Otherwise, the smart controller 3 may simply unlock the doors at step S4. In this case, if the doors are not opened for a period, the smart controller 3 may lock the doors again.

When the user touches the outside doorknob by the driver's seat and the corresponding touch sensor 5 senses the touch before the smart controller 3 determines at step S5 that a period (ex. T1 second) has passed after the doors transited to the state of the stand-by, the touch sensor 5 sends out the signal indicating the sensing to the smart controller 3. Then at step S6 the smart controller 3 determines that the touch was detected and at step S7 sends a signal requesting for unlocking the door by the driver's seat to the door controller 4. As a result, the door by the driver's seat is unlocked. Subsequently, until determining at step S8 that a period (ex. T2 second) has passed after the door is unlocked, the smart controller 3 makes a decision as to whether the door has opened at step S9. If the decision is YES (opened), the smart controller 3 makes the door controller 4 unlock all of the doors at step S10. On the other hand, if the smart controller 3 determines that the period (ex. T2 second) has passed at step S8 before the door is opened, it makes the door controller 4 lock the door again and terminates executing the door unlocking process.

In leaving the vehicle, the user with the mobile communicator 17 may turn on the door lock switch 9 or the remote switches 19 to lock the doors. In addition, the smart controller 3 may lock the doors when it determines that the mobile communicator 17 is in neither of the first response areas S1 and the second response area TA.

If the mobile communicator 17 is in the first response areas SA around the trunk, the ex-trunk receiver 11b also receives the response signal from the mobile communicator 17. At step S4 the smart controller 3 also enables the trunk unlock switch 10 based on that the ex-trunk receiver 11b receives the response signal. When the period (ex. T1 second) passes after enabling the trunk unlock switch 10, the smart controller 3 disables the trunk unlock switch 10 again.

In addition, the smart key system 1 executes warning and unlocking process. In the warning and unlocking process, the smart controller 3 makes the buzzer 8 produce a warning sound when the mobile communicator 17 is locked in the trunk. Moreover in the warning and unlocking process, the smart controller 3 enables the trunk unlock switch 10 so that the user can take out the mobile communicator 17. The warning and unlocking process includes an on-trunk-unlock process, an on-trunk-lock process and an on-switch-unlock process. These processes will be described below.

Figure 4:
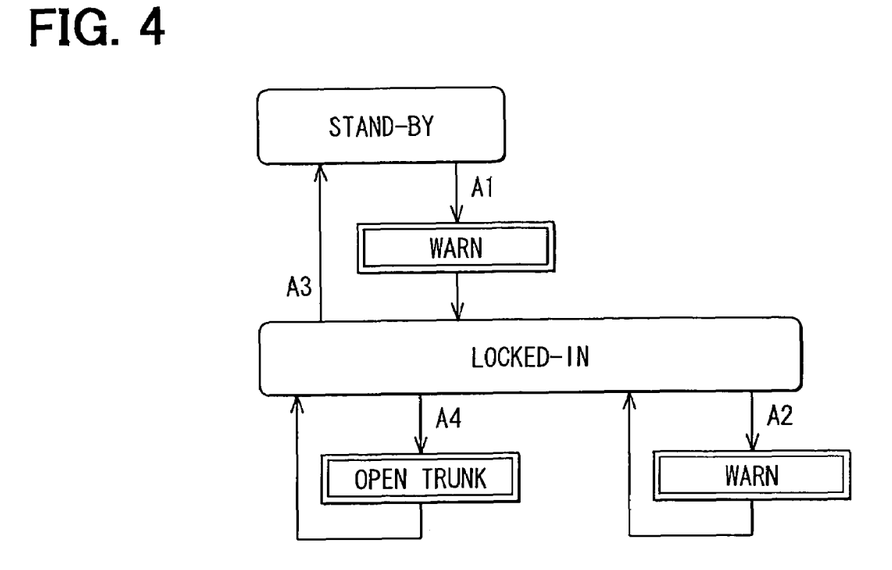
FIG. 4 shows a state chart of a smart controller.

The smart controller 3 is in a stand-by state or a locked-in state shown in FIG. 4. The stand-by state corresponds to a state in which the mobile communicator 17 is not locked in the trunk. The locked-in state corresponds to a state in which the mobile communicator 17 is locked in the trunk. The smart controller 3 stores a locked-in flag for specifying which state it is currently in to its memory. When the locked-in flag is ON, it is in the locked-in state. When the locked-in flag is OFF, it is in the stand-by state. As shown in FIG. 4, it produces the warning sound and transits from the stand-by state to the locked-in state when it executes the on-trunk-unlock process and the on-trunk-lock process and determines that the mobile communicator 17 is locked in the trunk as a result of both processes (See an arrow A1 in FIG. 4).

The smart controller 3 in the locked-in state also produces the warning sound, when it executes the on-trunk-lock process and determines in the process that the mobile communicator 17 is locked in the trunk. On the other hand, the smart controller 3 in the locked-in state transits to the stand-by state when it executes the on-trunk-lock process and determines in the process that the mobile communicator 17 is taken out of the trunk. In addition, the smart controller 3 in the locked-in state makes trunk controller 2 unlock the trunk when the user turns on the trunk unlock switch 10.

Figure 5:
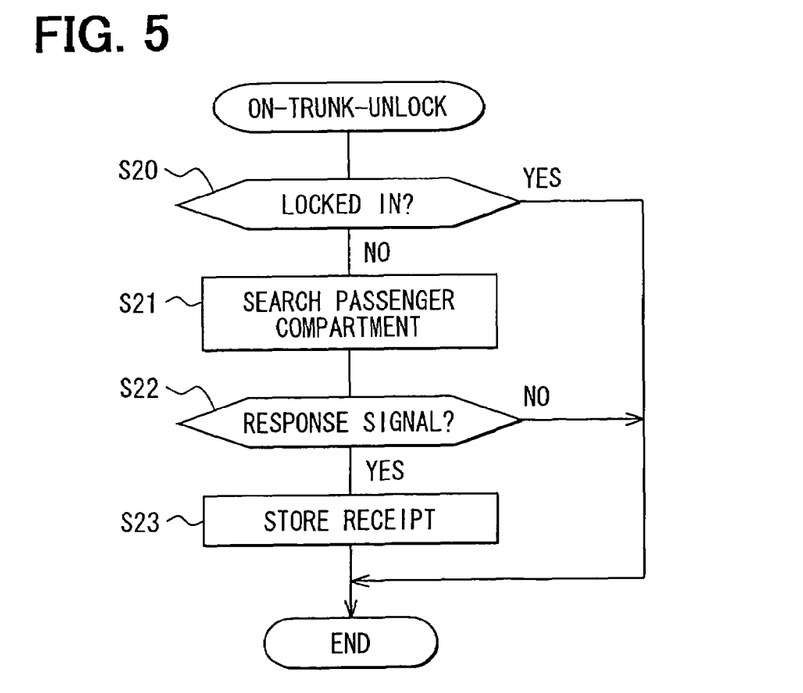
FIG. 5 shows a flowchart of an on-trunk-unlock process.

The smart controller 3 executes the on-trunk-unlock process shown in FIG. 5 when the trunk gets unlocked, except when the trunk unlock switch 10 is operated to unlock the trunk. For example, the smart controller 3 executes the on-trunk-unlock process when the user operates a mechanical engine key or a mechanical lever in the passenger compartment to unlock the trunk. As described above, the smart controller 3 is notified of locking and unlocking of the trunk by the trunk controller 2.

When the trunk gets unlocked, the smart controller 3 makes a decision at step S20 as to whether the mobile communicator 17 is locked in according to the locked-in flag. If the decision is NO (not locked in), it executes a passenger compartment interior search process at step S21. In the passenger compartment interior search process, it makes the in-room transmitter 15 transmit the second query signal and verifies that it received a response signal from the legitimate mobile communicator 17 which is verified by means of the IDs as described above.

If the mobile communicator 17 receives the second query signal, the mobile controller 21 retrieves the mobile-side ID from its memory and makes the transmitter 23 transmit a response signal including the mobile-side ID to the in-room receiver 11c.

If the smart controller 3 receives the response signal from the legitimate mobile communicator 17 (YES at step S22), it stores the receipt into its memory or another accessible memory at step S23. The result of the passenger compartment interior search process is preserved at shortest until the trunk is locked.

Figure 6:
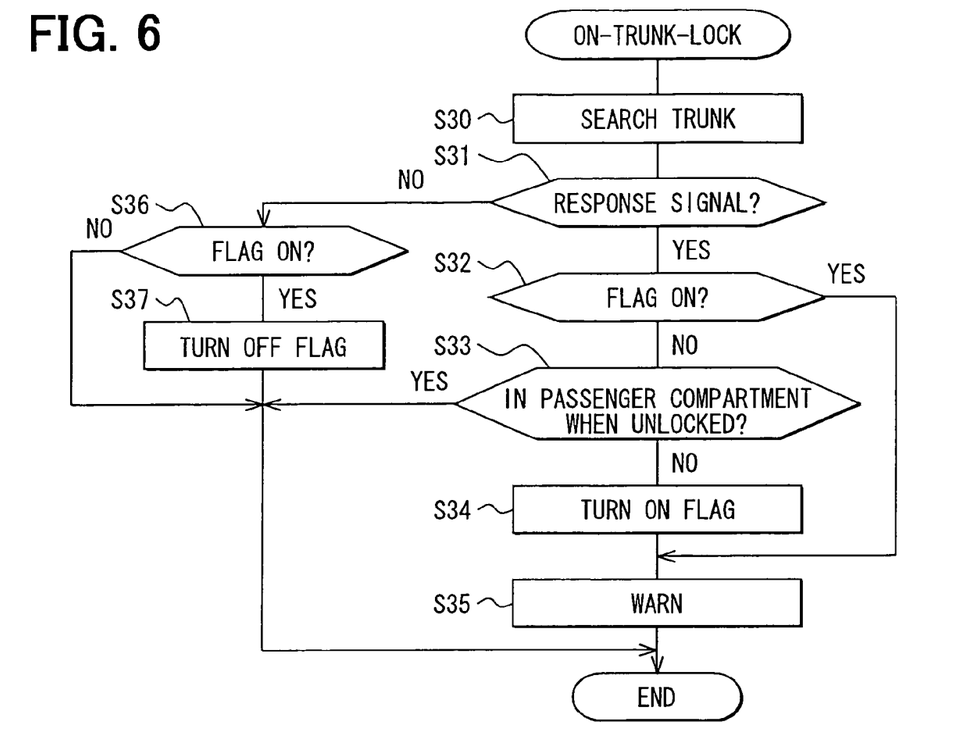
FIG. 6 shows a flowchart of an on-trunk-lock process.

When the trunk is locked, the smart controller 3 executes the on-trunk-lock process shown in FIG. 6 irrespective of the state (stand-by/locked-in) it is in, as shown in FIG. 4. In the process, the smart controller 3 executes a trunk interior search process at step S30 at first. In the trunk interior search process, it makes the in-trunk transmitter 14 transmit the third query signal at step S30 and verifies that it received a response signal from the legitimate mobile communicator 17 which is verified by means of the IDs as described above.

If the mobile communicator 17 receives the third query signal, its mobile controller 21 retrieves the mobile-side ID from its memory and makes the transmitter 23 transmit a response signal including the mobile-side ID to the in-trunk receiver 11d.

If the smart controller 3 does not receive the response signal from the legitimate mobile communicator 17 at step S30, it decides that there is no response signal from the mobile communicator 17 at step S31 and subsequently executes step S36. At step S36, it makes a decision as to whether the locked-in flag is ON, that is, whether it is in the locked-in state. If there is no response in the trunk interior search process and the locked-in flag is ON, the mobile communicator 17 has already been taken out of the trunk. If the decision of step S36 is YES (ON), the smart controller 3 turns off the locked-in flag at step S37. Thus, the smart controller 3 transits to the stand-by state as shown by an arrow A3 in FIG. 4. If the decision of step S36 is NO (OFF), the smart controller 3 terminates the on-trunk-lock process.

If the smart controller 3 receives the response signal from the legitimate mobile communicator 17 at step S30, the decision of step S31 becomes YES and it subsequently executes step S32. At step S32, it makes the decision as to whether the locked-in flag is ON. If the decision is YES (ON), it makes the buzzer 8 produce the warning sound at step S35. When it executes step S32 and next step S35 in succession, it remains in the locked-in state as shown by an arrow A2 in FIG. 4.

If the decision of step S32 is NO (OFF), it executes step S33. At step S33, it makes a decision as to whether the mobile communicator 17 was in the passenger compartment when the trunk was unlocked, according to the stored result of the passenger compartment interior search process (FIG. 5). If the stored result indicates that the mobile communicator 17 was not in the passenger compartment when the trunk was unlocked, the decision becomes NO. This decision may be regarded as the final conclusion that the mobile communicator 17 is currently locked in the trunk. Following the decision, it turns on the locked-in flag at step S34 to memorize that it transited from the stand-by state to the locked-in state. When it executes step S34, it transit to the locked-in state as shown by the arrow A1 in FIG. 4. Then a warning is made at step S35 to indicate that the mobile communicator 17 is left in the trunk. If the stored result shows that the mobile communicator 17 was in the passenger compartment when the trunk was unlocked, the decision of step S33 becomes YES and the smart controller 3 terminates executing the on-trunk-lock process. This decision may be regarded as the final conclusion that the mobile communicator 17 is not currently locked in the trunk.

The above processes are summarized as follows. The smart controller 3 determines that the mobile communicator 17 is currently locked in the trunk when both of the following conditions X and Y are satisfied, and executes a recovery process according to the determination. The condition X is that the mobile communicator 17 was not in the passenger compartment according to the interior search process executed when the trunk was unlocked. The condition Y is that the mobile communicator 17 is in the trunk according to the trunk interior search process executed when the trunk was locked.

Thus, the smart controller 3 is capable of detecting a situation where the mobile communicator 17 is locked in the trunk more accurately than ever and reduces the possibility of erroneous warning.

The recovery process includes a process to notify the user of that the mobile communicator 17 is locked in the trunk by a warning sound as described above.

In addition, the recovery process includes a process to enable the trunk unlock switch 10 to allow the user to open the trunk without the mobile communicator 17. The smart controller 3 executes the process as an on-switch-unlock process shown in FIG. 7 when the trunk unlock switch 10 is operated and turned on. First, the smart controller 3 makes a decision at step S40 as to whether the mobile communicator 17 is locked in the trunk according to the locked-in flag. If the decision is NO, it makes a decision as to whether the legitimate mobile communicator 17 is close to the trunk at step S44. Specifically, it makes a decision as to whether the legitimate mobile communicator 17 is in the first response area SA which is neighboring to the trunk. If the decision of step S44 is YES, it makes the trunk controller 2 unlock the trunk at step S43.

Figure 7:
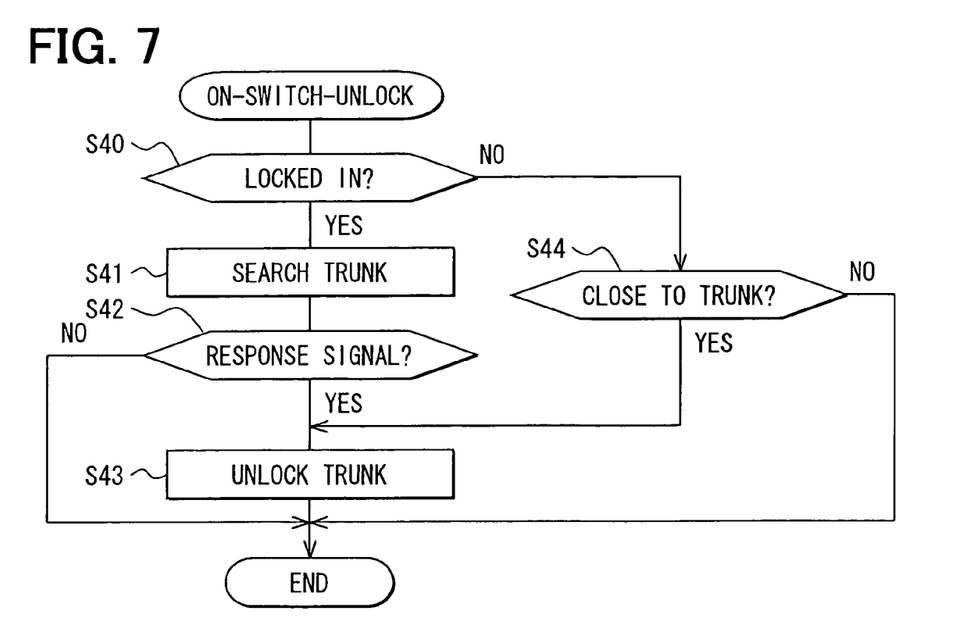
FIG. 7 shows a flowchart of an on-switch-unlock process.

If the decision of step S40 is YES (locked in), it executes the trunk interior search process at step S41. If it receives the response signal from the legitimate mobile communicator 17 at step S41, the decision of step S42 becomes YES and it subsequently unlocks the trunk at step S43. By executing step S42 and step S43, it remains in the locked-in state as shown by an arrow A4 in FIG. 4. On the other hand, if the decision of step S42 is NO, it terminates the on-switch-unlock process without unlocking the trunk. The process of step S41 and S42 can be omitted. In other words, the smart controller 3 may unlock the trunk at step S43 simply if it determines that the mobile communicator 17 is locked in the trunk at step S40.

The on-trunk-unlock process in FIG. 5 and the on-trunk-lock process in FIG. 6 can be modified as follows. When the smart controller 3 determines that mobile communicator 17 is in the passenger compartment at the passenger compartment interior search process of step S21, the smart controller 3 may subsequently search the passenger compartment for the mobile communicator 17 periodically at shortest until the trunk is locked. In other words, the smart controller 3 may subsequently execute the passenger compartment interior search process periodically. The every result of the search may be memorized. In this case, the smart controller 3 can detect that the mobile communicator 17 is taken out of the passenger compartment after the trunk is unlocked.

In addition, the smart controller 3 may make buzzer 8 produce the warning sound based on that the two conditions are satisfied. The first condition is that the smart controller 3 receives a response signal from the legitimate mobile communicator 17 at the trunk interior search process of step S30. The second condition is that the results of the search describe that the mobile communicator 17 is missing at the time of locking the door although it was in the passenger compartment at the time of unlocking. By doing this, the smart controller 3 can also unlock the trunk to take out the mobile communicator 17 without significantly depending on the shape of the area which the third query signal reaches. Thus, the smart controller 3 becomes capable of detecting a situation where the mobile communicator 17 is locked in the trunk more accurately than ever and reduces the possibility of erroneous warning.

Second Embodiment

Figure 8:
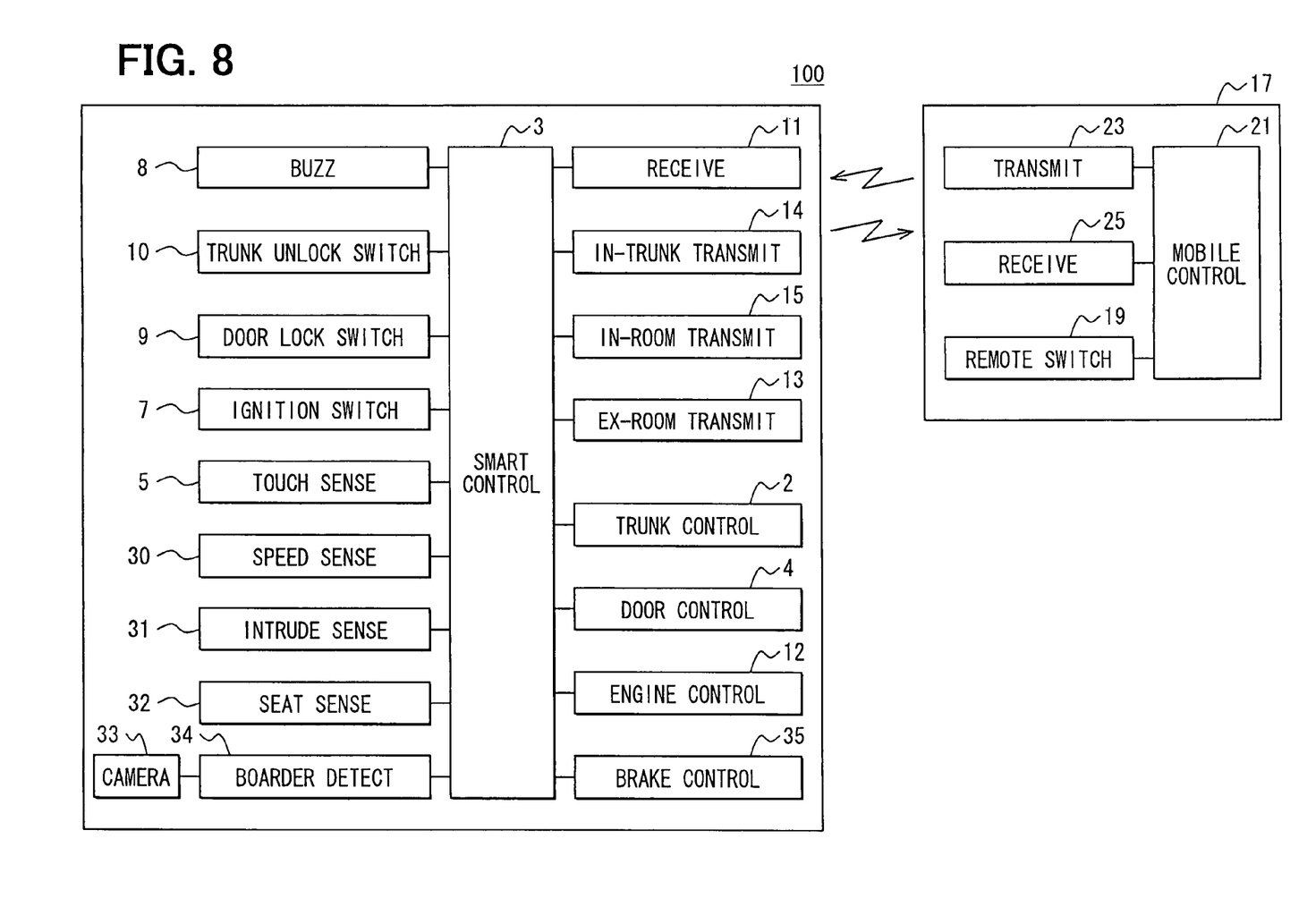
FIG. 8 shows a block diagram of a smart key system in the second embodiment of the present invention.

A smart key system 100 of the second embodiment is different from the smart key system 1 of the first embodiment in that the smart controller 3 is connected with a speed sensor 30, an intruder sensor 31, a seat sensor 32, a camera 33, a boarder detection controller 34 and a brake controller 35. and that the smart controller 3 operates as described below. Specifically, the brake controller 35 is connected bi-directionally with the smart controller 3 through the gateway device.

The brake controller 35 detects amount of depression of a brake pedal of the vehicle by a displacement sensor and sends a signal including the amount, in response to a request signal from the smart controller 3. The brake controller 35 also operates as a usual ABS (Anti-lock Brake System) controller.

The speed sensor 30 detects speed of the vehicle according to the amount of movement of the vehicle transmission or amount of rotations of the vehicle wheels and sends a signal including the detected speed to the smart controller 3. The speed sensor 30 may send the signal to the smart controller 3 through the engine controller 12. The intruder sensor 31 may be an infrared sensor. The seat sensor 32 may have a piezoelectric sensor which is installed in seats of the vehicle and detects boarders on the seats. The camera 33 is installed, for example, in an instrument panel of the vehicle. The boarder detection controller 34 receives image data taken by the camera 33 and determines whether a person is in the passenger compartment.

The smart controller 3 of this embodiment executes the on-trunk-unlock process (FIG. 5) described in the first embodiment.

In addition, the smart controller 3 executes an auto-lock preparation process. When the mobile communicator 17 transmits a signal requesting for unlocking the doors according to the user's operation of the remote switches 19 and the rear receiver 11e receives the signal, the smart controller 3 makes the door controller 4 to unlock the doors and start executing the auto-lock preparation process. In the auto-lock preparation process, it makes a decision as to whether the door has been kept closed for a period since the unlocking was made. If the door has not been opened in the period, the smart controller 3 makes the door controller 4 lock the doors.

In the first embodiment, if the smart controller 3 determines that the mobile communicator 17 is locked in the trunk, it executes electrical process like enabling the trunk unlock switch 10 and warning. However, even when the mobile communicator 17 is locked in the trunk, there is no need of enabling the trunk unlock switch 10 for other persons out of the vehicle if the user can unlock the trunk by using a switch in the passenger compartment. Besides, from the standpoint of the security, it is better to avoid making the trunk unlock switch 10 operable by persons without the mobile communicator 17, if possible. Taking this into account, the smart controller 3 of the second embodiment executes the above electrical process only if the user cannot operate the switch in the passenger compartment.

Figure 9:
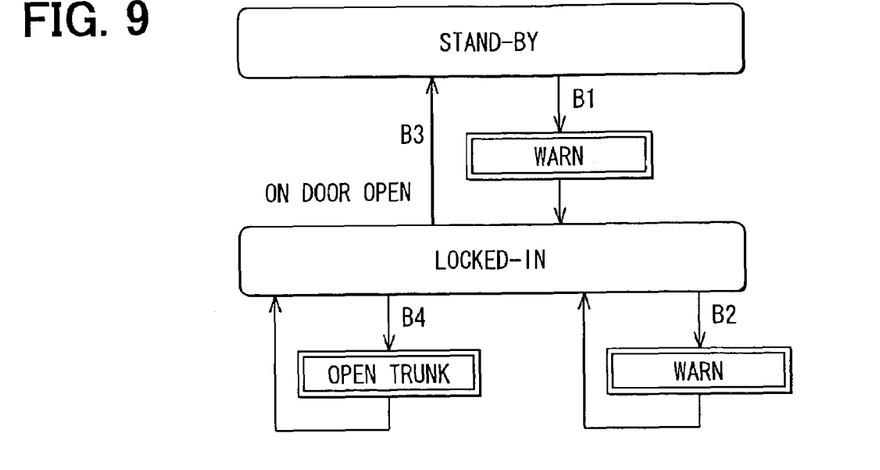
FIG. 9 shows a state chart of a smart controller.

As shown in FIG. 9, the smart controller 3 of the second embodiment is also in the stand-by state or the locked-in state. If the smart controller 3 in the stand-by state executes another on-trunk-lock process and determines in the process that the mobile communicator 17 is locked in the trunk in the process, it makes buzzer 8 produce a warning sound and transits to the locked-in state, as shown by an arrow B1 in FIG. 9.

The smart controller 3 in the locked-in state makes buzzer 8 produce the warning sound as shown by an arrow B2, if it executes the on-trunk-lock process and determines in the process that the mobile communicator 17 is locked in the trunk in the process. On the other hand, if the smart controller 3 in the locked-in state executes the on-trunk-lock process and determines in the process that the mobile communicator 17 has been taken out of the trunk in the process, it transits to the stand-by process as shown by an arrow B3. In addition, if the trunk unlock switch 10 is turned on while the smart controller 3 is in the locked-in state, it makes trunk controller 2 unlock the trunk as shown by an arrow B4.

Figure 10:
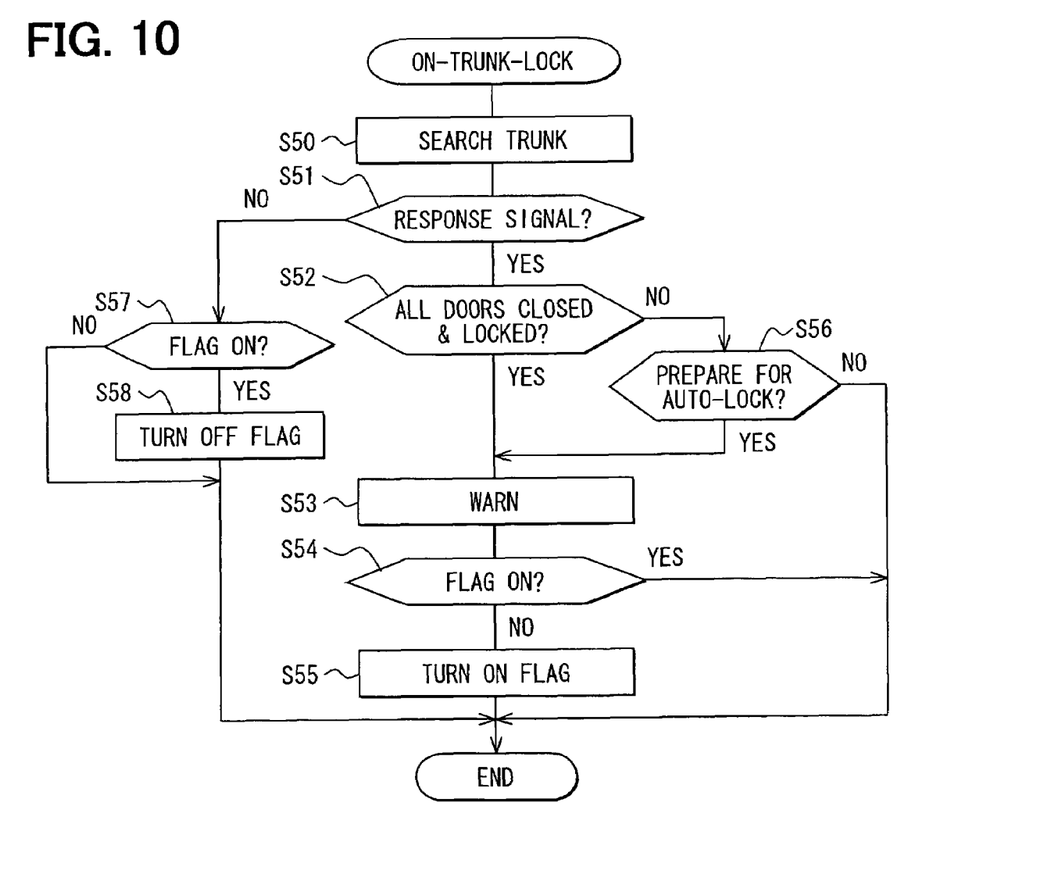
FIG. 10 shows a flowchart of another on-trunk-lock process.

The smart controller 3 executes the on-trunk-lock process shown in FIG. 10 when the trunk gets locked. First in the process, the smart controller 3 at step S50 executes the trunk interior search process, which is the same as the process of step S30 and S41 in the first embodiment.

If the smart controller 3 does not receive the response signal from the legitimate mobile communicator 17 at step S50, it decides that there is no response signal from the mobile communicator 17 at step S51 and subsequently executes step S57. At step S57, it makes a decision as to whether the locked-in flag is ON. If the decision of step S57 is YES (ON), the smart controller 3 turns off the locked-in flag at step S58. Thus, the smart controller 3 transits to the stand-by state as shown by the arrow B3 in FIG. 9.

If the smart controller 3 receives the response signal from the legitimate mobile communicator 17 at step S50, the decision of step S51 becomes YES and it subsequently executes step S52. At step S52 it sends a query signal asking the door controller 4 whether the doors are closed and locked. By sending the query signal, it acts as a parking state confirmation means. If it receives a signal from the door controller 4 which indicates that all of the doors are closed and locked, it determines at step S52 that the vehicle is in a parking state. In other words, it determines that the user is locked out of the passenger compartment. Based on the determination, it makes the buzzer 8 produce the warning sound at step S53. On the other hand, if it receives a signal from the door controller 4 which tells that either of the doors is unlocked, it executes step S52 and subsequently step S56 and makes a decision as to whether it is executing the auto-locking preparation process. If the decision is YES, it makes the buzzer 8 produce the warning sound at step S53.

Thus, even in the situation where all of the doors are going to be locked after a while, the smart controller 3 determines that the vehicle is in the parking state.

Subsequently, the smart controller 3 makes a decision as to whether the locked-in flag is ON at step S54. If the decision is NO, it turns on the locked-in flag at step S55. If the decision is YES, it terminates the on-trunk-lock process.

If the decision of step S56 is NO, it determines that the vehicle is in a non-parking state. In other words, it determines that the mobile communicator 17 is in the trunk and the user is still not totally locked out of the passenger compartment. Thus, the smart controller 3 determines that the mobile communicator 17 is currently locked in the trunk when both of the following conditions P and Q are satisfied, and executes the above electrical process according to the determination. The condition P is that the mobile communicator 17 was not in the passenger compartment according to the interior search process executed when the trunk was unlocked. The condition Q is that the all the doors are closed and locked or the smart controller 3 is executing the auto-locking preparation process.

Moreover, the smart controller 3 executes an on-door-open process shown in FIG. 9. When the smart controller 3 is in the locked-in state and one of the doors gets opened, it executes the on-door-open process to turn off the locked-in flag and transit to the stand-by state. The on-door-open process is executed based on the concept that once the door is opened, the user is no longer totally locked out of the passenger compartment.

Besides, one or more supplementary conditions can be added to the conditions P and Q. In other words, the smart controller 3 may determine that the mobile communicator 17 is currently locked in the trunk when the one or more supplementary conditions are satisfied as well as the conditions P and Q and determine otherwise when at least one of condition P, condition Q, and the supplementary conditions is not satisfied. Specifically, the smart controller 3 may determine that the mobile communicator 17 is not currently locked in the trunk when a person is in the passenger compartment. This determination is based on the concept that the person in the passenger compartment can open the trunk easily.

With the help of the speed sensor 30, the intruder sensor 31, the seat sensor 32, the camera 33 and the boarder detection controller 34 shown in FIG. 8, the smart controller 3 can determine whether a person is in the passenger compartment with high accuracy. Thus, the smart controller 3 can determine with a high accuracy whether the vehicle is in a non-parking state where the user can open the trunk from within the passenger compartment, or in the parking state where the user is locked out of the passenger compartment or going to be locked in the passenger compartment after a certain period.

Figure 11:
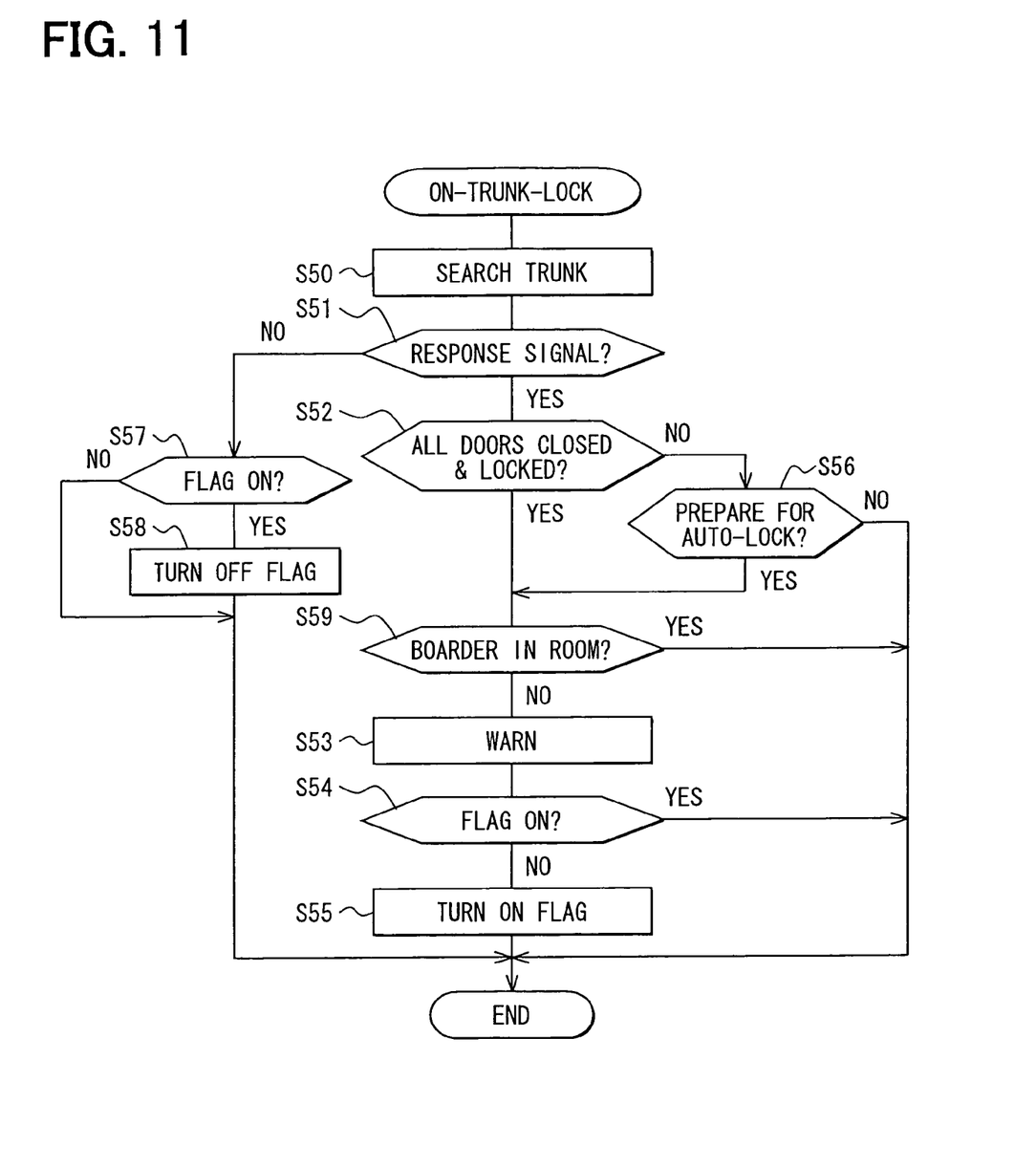
FIG. 11 shows a flowchart of another on-trunk-lock process.

For example, as shown in step S59 in FIG. 11, a step for determining whether a person is in the passenger compartment may be added to the on-trunk-lock process shown in FIG. 10. The decision that a person is not in the passenger compartment can be made according to the conditions (i)-(v) as follows.

(i) The speed sensor 30 detects that the speed of the vehicle is zero.
(ii) The seat sensor 32 detects that no one is on the seats.
(iii) The brake pedal is not depressed.
(iv) The intruder sensor 31 does not detect a boarder.
(v) The boarder detection controller 34 does not detect a boarder.

The conditions can be used in combination. In other words, it may decide that a person is not in the passenger compartment and therefore that the vehicle is in the parking state and executes the recovery process, when some of the above conditions are satisfied. Besides, in addition to the on-door-open process, the smart controller 3 may execute a process in which it transits from the locked-in state to the stand-by state when the speed rises above zero, when the seat sensor 32 detects a person on the seats or when the operation of the brake pedal is detected.

The present invention should not be limited to the embodiment discussed above and shown in the figures, but may be implemented in various ways without departing from the spirit of the invention.

For example, in transmitting the response signal, the mobile controller 21 of the mobile communicator 17 may include data regarding which the mobile communicator 17 is in between the first response areas SA and the second response area TA in the response signal.

In addition, the smart key system may execute the recovery process for the mobile communicator locked in the trunk when all of the conditions (1)-(4) below are satisfied.

Condition (1): The mobile communicator was not in the passenger compartment when the trunk gets unlocked.
Condition (2): The in-trunk receiver 11d received a response signal from the mobile communicator 17 when the trunk gets locked.
Condition (3): All the doors are locked when the trunk gets locked.
Condition (4): No one is in the passenger compartment when the trunk gets locked.

What is claimed is:

1. A smart key system for a vehicle comprising:
an in-trunk communicator provided within a trunk of a vehicle and configured for wirelessly communicating with a mobile communicator in the trunk of the vehicle;
a trunk lock status detector for detecting a lock/unlock status of the trunk;
a controller for executing:
an ex-room process for determining that the mobile communicator is not in a passenger compartment of the vehicle;
an in-trunk process for determining that the in-trunk communicator communicates with the mobile communicator when the trunk lock status detector detects that the trunk gets locked; and
a predetermined process for the mobile communicator locked in the trunk, based on the determinations of the ex-room process and the in-trunk process, wherein the in-trunk communicator is located at a corner of the trunk,
wherein the in-trunk communicator includes a transmitter and a receiver located at different corners of the trunk.

2. A smart key system for a vehicle comprising:
an in-trunk communicator for wirelessly communicating with a mobile communicator in a trunk of the vehicle;
a trunk lock status detector for detecting a lock/unlock status of the trunk;
a controller for executing:
   an ex-room process for determining that the mobile communicator is not in a passenger compartment of the vehicle;
   an in-trunk process for determining that the in-trunk communicator communicates with the mobile communicator when the trunk lock status detector detects that the trunk gets locked; and
   a predetermined process for the mobile communicator locked in the trunk, based on the determinations of the ex-room process and the in-trunk process,
wherein the controller executes the ex-room process when the trunk lock stabs detector detects that the trunk gets unlocked.

3. The smart key system for a vehicle in claim 2, further comprising an in-room communicator for wirelessly communicating with a mobile communicator in the passenger compartment, wherein the controller executes the ex-room process based on that the in-room communicator communicates with the mobile communicator.

4. The smart key system according to claim 2, wherein the predetermined process includes:
a trunk unlock process for allowing a user of the vehicle to open the trunk without the mobile communicator when a switch on the outer surface of the vehicle is operated by the user; and
a notification process for notifying the user of that the mobile communicator is locked in the trunk.

5. A smart key system for a vehicle comprising:
an in-trunk communicator for wirelessly communicating with a mobile communicator in a trunk of the vehicle;
a trunk lock status detector for detecting a lock/unlock status of the trunk;
a door lock status detector for detecting the lock/unlock status of doors of the vehicle;
a speed sensor and a brake sensor; and
a controller for executing:
   a locked-out process for determining that a user of the vehicle is locked out of the passenger compartment;
   an in-trunk process for determining that the in-trunk communicator communicates with the mobile communicator when the trunk lock status detector detects that the trunk gets locked; and
   a predetermined process for the mobile communicator locked in the trunk, based on the determinations of the lock-out process and the in-trunk process,
wherein the controller executes the locked-out process based on that the door lock status detector detects that all the doors are locked,
wherein the controller executes the locked-out process based further on that a vehicle speed which the speed sensor detects is zero and the brake pedal is not being operated.

6. The smart key system according to claim 5, further comprising a boarder detector for detecting a boarder of the vehicle, wherein the controller executes the locked-out process based further on that the boarder detector detects no one in the vehicle.

7. A smart key system for a vehicle comprising:
an in-trunk communicator for wirelessly communicating with a mobile communicator in a trunk of the vehicle;
a lock status detector for detecting a lock/unlock status of the trunk;
a door lock status detector for detecting the lock/unlock status of doors of the vehicle;
a speed sensor and a brake sensor; and
a controller for executing:
   a locked-out process for determining that a user of the vehicle is going to be locked out of the passenger compartment;
   an in-trunk process for determining that the in-trunk communicator communicates with the mobile communicator when the lock status detector detects that the trunk gets locked; and
   a predetermined process for the mobile communicator locked in the trunk, based on the determinations of the lock-out process and the in-trunk process,
wherein the controller executes the locked-out process based on that the door lock status detector detects that all the doors are going to be locked,
wherein the controller executes the locked-cut process based further on that a vehicle speed which the speed sensor detects is zero and the brake pedal is not being operated.

8. A smart key system for a vehicle comprising:
an in-trunk communicator for wirelessly communicating with a mobile communicator in a trunk of the vehicle;
a trunk lock status detector for detecting a lock/unlock status of the trunk;
a boarder detector for detecting a boarder of the vehicle; and
a controller for executing:
   a no-boarder process for determining that the boarder detector detects no one in the vehicle when the trunk lock status detector detects that the trunk gets locked;
   an in-trunk process for determining that the in-trunk communicator communicates with the mobile communicator when the trunk lock status detector detects that the trunk gets locked; and
   a predetermined process for the mobile communicator locked in the trunk, based on the determinations of the no-boarder process and the in-trunk process.

9. The smart key system according to claim 8, wherein the boarder detector comprises at least one of a camera installed in a passenger compartment of the vehicle, a seat sensor for detecting a boarder on a seat of the vehicle, a speed sensor for detecting a vehicle speed and a brake sensor for detecting an operation of a brake of the vehicle.

10. The smart key system for a vehicle in claim 8, wherein the in-trunk communicator is located at a corner of the trunk.

11. The smart key system for a vehicle in claim 10, wherein the in-trunk communicator includes a transmitter and a receiver located at different corners of the trunk.

12. The smart key system for a vehicle in claim 8, wherein the predetermined process is executed only if both (i) the no-board process has determined that the boarder detector detected no one in the vehicle when the trunk lock status detector detected that the trunk gets locked and (ii) the in-trunk process has determined that the in-trunk communicator is communicating with the mobile communicator when the trunk lock status detector detected that the trunk gets locked.

* * * * *